(12) United States Patent
Bittar et al.

(10) Patent No.: US 7,345,487 B2
(45) Date of Patent: Mar. 18, 2008

(54) METHOD AND SYSTEM OF CONTROLLING DRILLING DIRECTION USING DIRECTIONALLY SENSITIVE RESISTIVITY READINGS

(75) Inventors: Michael S. Bittar, Houston, TX (US); Jesse K. Hensarling, Cleveland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/385,404

(22) Filed: Mar. 21, 2006

(65) Prior Publication Data

US 2006/0157277 A1 Jul. 20, 2006

Related U.S. Application Data

(63) Continuation-in-part of application No. 11/243,131, filed on Oct. 4, 2005, which is a continuation of application No. 10/254,184, filed on Sep. 25, 2002, now Pat. No. 7,098,858.

(51) Int. Cl.
*G01V 3/30* (2006.01)
*G01V 3/38* (2006.01)

(52) U.S. Cl. ........................... 324/338
(58) Field of Classification Search ......... 324/338–343
See application file for complete search history.

(56) References Cited

U.S. PATENT DOCUMENTS

| | | | | |
|---|---|---|---|---|
| 3,944,910 A * | 3/1976 | Rau | ............................. | 324/338 |
| 4,670,717 A * | 6/1987 | Sender | ........................ | 324/338 |
| 5,089,779 A * | 2/1992 | Rorden | ........................ | 324/339 |
| 5,184,079 A * | 2/1993 | Barber | ........................ | 324/339 |
| 5,309,404 A * | 5/1994 | Kostek et al. | ................. | 367/31 |
| 5,465,799 A * | 11/1995 | Ho | ............................... | 175/61 |
| 5,508,616 A * | 4/1996 | Sato et al. | ................... | 324/343 |
| 5,530,358 A * | 6/1996 | Wisler et al. | ................ | 324/338 |
| 6,088,655 A * | 7/2000 | Daily et al. | ..................... | 702/7 |
| 6,100,696 A * | 8/2000 | Sinclair | ........................ | 324/339 |
| 6,181,138 B1 * | 1/2001 | Hagiwara et al. | ............. | 324/338 |
| 6,206,108 B1 * | 3/2001 | MacDonald et al. | ........... | 175/24 |
| 6,833,795 B1 * | 12/2004 | Johnson et al. | ............ | 340/853.5 |
| 6,900,640 B2 * | 5/2005 | Fanini et al. | ................. | 324/339 |
| 6,911,824 B2 * | 6/2005 | Bittar | .......................... | 324/338 |
| 7,046,009 B2 * | 5/2006 | Itskovich | ..................... | 324/338 |
| 7,057,392 B2 * | 6/2006 | Wang et al. | ................. | 324/338 |
| 7,141,981 B2 * | 11/2006 | Folberth et al. | ............. | 324/334 |
| 2003/0229449 A1 * | 12/2003 | Merchant et al. | ............... | 702/7 |
| 2006/0017443 A1 * | 1/2006 | Folberth et al. | ............. | 324/338 |
| 2006/0149477 A1 * | 7/2006 | Cairns et al. | ................... | 702/6 |
| 2006/0255810 A1 * | 11/2006 | Yu et al. | ....................... | 324/338 |

* cited by examiner

*Primary Examiner*—Jay M Patidar
(74) *Attorney, Agent, or Firm*—Mark E. Scott; Conley Rose, PC (57) ABSTRACT

A method and system of controlling drilling direction using directionally sensitive resistivity readings. At least some of the illustrative embodiments are methods comprising transmitting an interrogating electromagnetic wave from a tool in a borehole into a formation surrounding the borehole, receiving a first responsive electromagnetic wave from the formation by a first receiving antenna having a sensitivity pattern with a single primary lobe, determining proximity of a bed boundary using the first responsive electromagnetic wave, and controlling drilling direction based on the proximity of the bed boundary.

24 Claims, 8 Drawing Sheets

METHOD AND SYSTEM OF CONTROLLING DRILLING DIRECTION USING DIRECTIONALLY SENSITIVE RESISTIVITY READINGS

CROSS-REFERENCE TO RELATED APPLICATIONS

This application is a continuation-in-part of application Ser. No. 11/243,131 filed Oct. 4, 2005 titled "Ruggedized Multilayer Printed Circuit Board Based Downhole Antenna," which is a continuation of application Ser. No. 10/254,184 filed Sep. 25, 2002 also titled "Ruggedized Multilayer Printed Circuit Board Based Downhole Antenna" now U.S. Pat. No. 7,098,858 issued Aug. 29, 2006. Each of these applications is incorporated by reference herein as if reproduced in full below.

BACKGROUND

In the art of directional drilling for hydrocarbons it is beneficial to keep the borehole in the geological zone capable of producing the hydrocarbons, also known as the "pay zone." The pay zone may, however, be only a few feet thick and yet several thousand feet from the surface. While the person in charge of drilling may have directional control of the drill string, the directional control is limited to at best a single degree of directional change. Therefore, course corrections to keep the borehole within the pay zone may take many hundreds of feet. Any mechanism which aids the driller in entering the pay zone and/or keeping the borehole within the pay zone would be beneficial.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct mechanical or electrical (as the context implies) connection, or through an indirect mechanical or electrical connection via other devices and connections.

DETAILED DESCRIPTION

Figure 1:
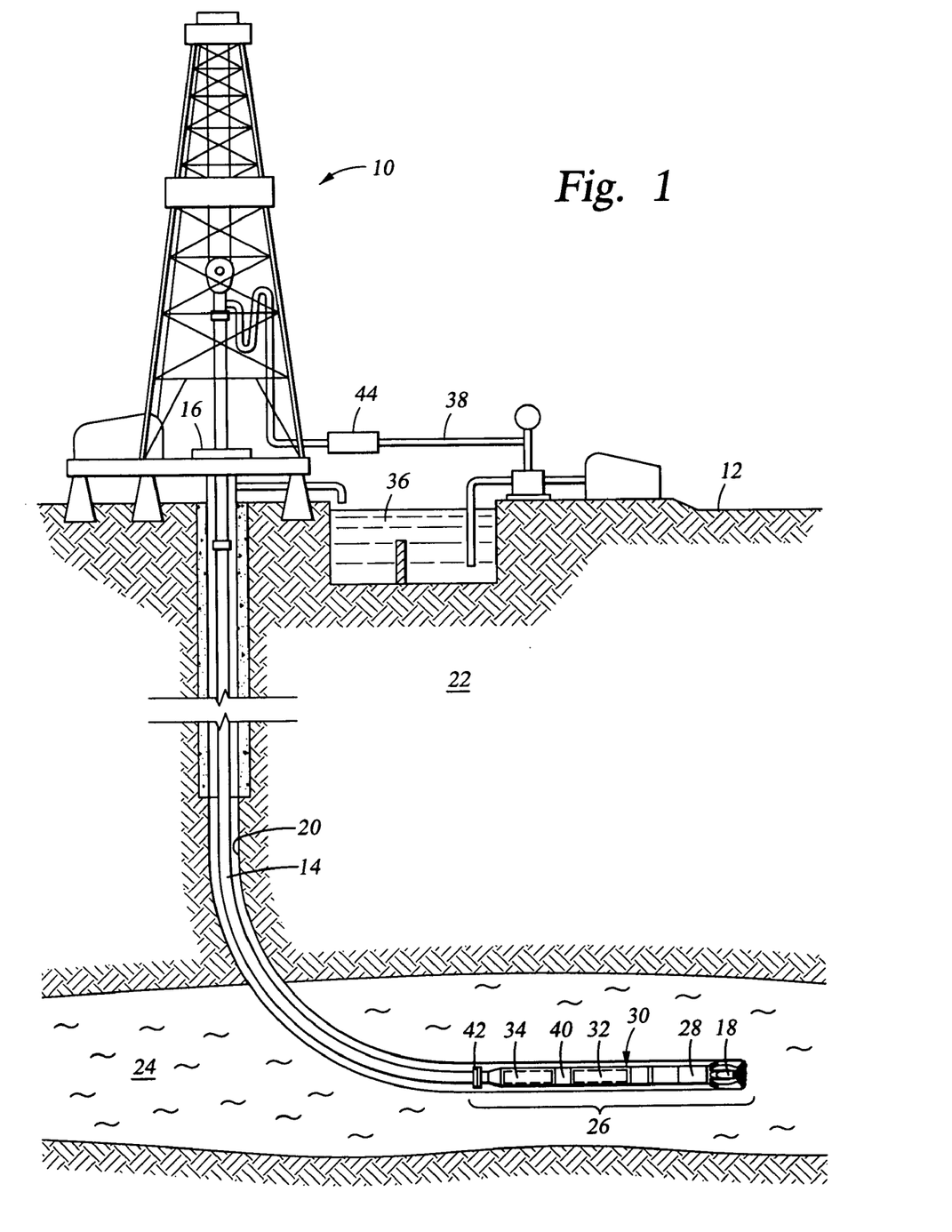
FIG. 1 illustrates a drilling system.

FIG. 1 illustrates a drilling system. In particular, the drilling system comprises a drilling rig 10 at the surface 12, supporting a drill string 14. In some embodiments, the drill string 14 is an assembly of drill pipe sections which are connected end-to-end through a work platform 16. In alternative embodiments, the drill string comprises coiled tubing rather than individual drill pipes. A drill bit 18 couples to the lower end of the drill string 14, and through drilling operations the bit 18 creates a borehole 20 through earth formations 22 and 24. The drill string 14 has on its lower end a bottom hole (BHA) assembly 26 which comprises the drill bit 18, a logging tool 30 built into collar section 32, directional sensors located in a non-magnetic instrument sub 34, a downhole controller 40, a telemetry transmitter 42, and in some embodiments a downhole motor 28.

Drilling fluid is pumped from a pit 36 at the surface through the line 38, into the drill string 14 and to the drill bit 18. After flowing out through the face of the drill bit 18, the drilling fluid rises back to the surface through the annular area between the drillstring 14 the borehole 20. At the surface the drilling fluid is collected and returned to the pit 36 for filtering. The drilling fluid is used to lubricate and cool the drill bit 18 and to remove cuttings from the borehole 20.

The downhole controller 40 controls the operation of telemetry transmitter 42 and orchestrates the operation of downhole components. The controller processes data received from the logging tool 30 and/or sensors in the instrument sub 34 and produces encoded signals for transmission to the surface via the telemetry transmitter 42. In some embodiments telemetry is in the form of mud pulses within the drill string 14, and which mud pulse are detected at the surface by a mud pulse receiver 44. Other telemetry systems may be equivalently used.

Figure 2:
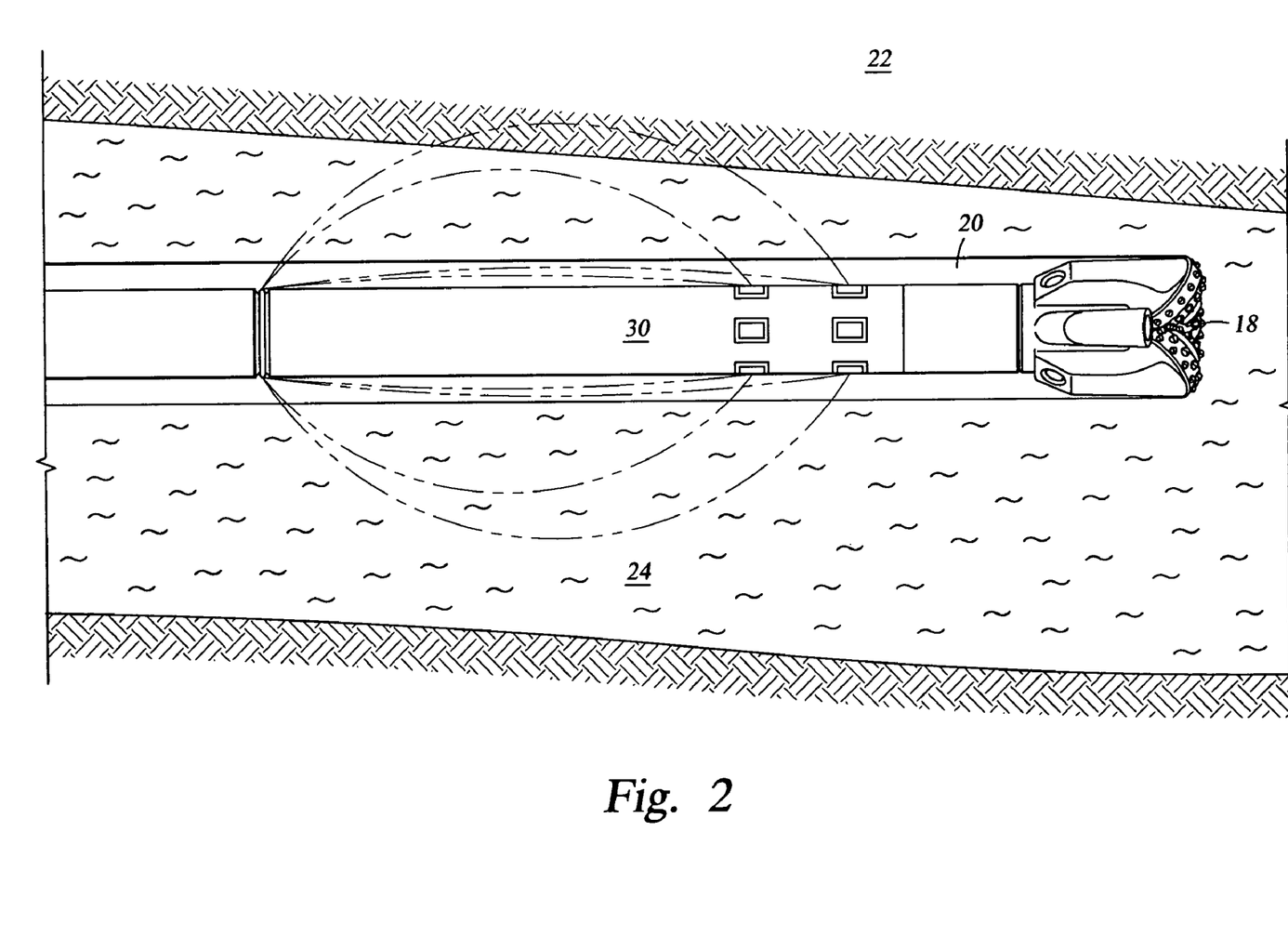
FIG. 2 illustrates in greater detail a portion of the bottom hole assembly.

FIG. 2 illustrates in greater detail a portion of the bottom hole assembly 26 creating a borehole 20 within earth formation 24. For purposes of explanation, assume that earth formation 24 is the pay zone in which the driller would like to keep the borehole. As illustrated in FIG. 2, the borehole 20 is approaching the geological bed boundary between earth formation 22 and earth formation 24. In accordance with embodiments of the invention, tool 30 aids the drilling operation by taking azimuthally or directionally sensitive resistivity readings of the formation proximate to the borehole. By one or both of taking directionally sensitive resistivity readings over time, and/or taking directionally sensitive resistivity readings at multiple depths of investigation, the tool may alert the driller controlling the drilling direction (or for that matter an automated system where corrections to direction are made by hardware and software downhole) of the proximity of the bed boundary so that corrective action may be taken.

Determining the proximity of the bed boundary can take many forms. In some embodiments, an overall system that directionally senses resistivity in only one radial direction (relative to the drill string 14) is employed, and based on rotation of the drill string 14 azimuthally sensitive resistivity surrounding the borehole 20 is determined. By correlating the resistivity readings with a rotational angle indication (e.g., from a fluxgate, magnetometer, accelerometer, or gyroscope), and by comparing resistivity readings on opposite sides of the borehole (180 degrees apart), the proximity of the bed boundary may be determined. In embodiments wherein multiple radial depths are probed, the comparison may also be between comparable radial depths. In alternative embodiments, the tool 30 has a plurality of directionally sensitive receiving antennas (discussed more fully below), such that resistivity readings on opposite sides of the borehole 20 are taken substantially simultaneously. These embodiments are useful not only when the drill string 14 is turning, but also in situations where the drill string is not turning (e.g., where a downhole mud motor is used as the driving rotational force for the drill bit). By correlating the readings from opposite sides of the tool 30 with a rotational angle indication, and comparing the resistivity readings, the proximity of the bed boundary may be determined. Similarly to the embodiments sensing resistivity in only one radial direction as discussed above, if multiple radial depths are probed, the comparisons may be of the multiple radial depths.

Regardless of the physical embodiment of the tool 30, comparisons may be made by taking ratios of resistivity readings on opposite sides of the tool, or by taking differences of the resistivity readings on opposite sides of the tool. In yet further embodiments where multiple radial depths are probed, comparisons to readings on opposite sides of the tool may not be needed, and instead the comparison could be between different radial depths on the same side of the tool.

Figure 3:
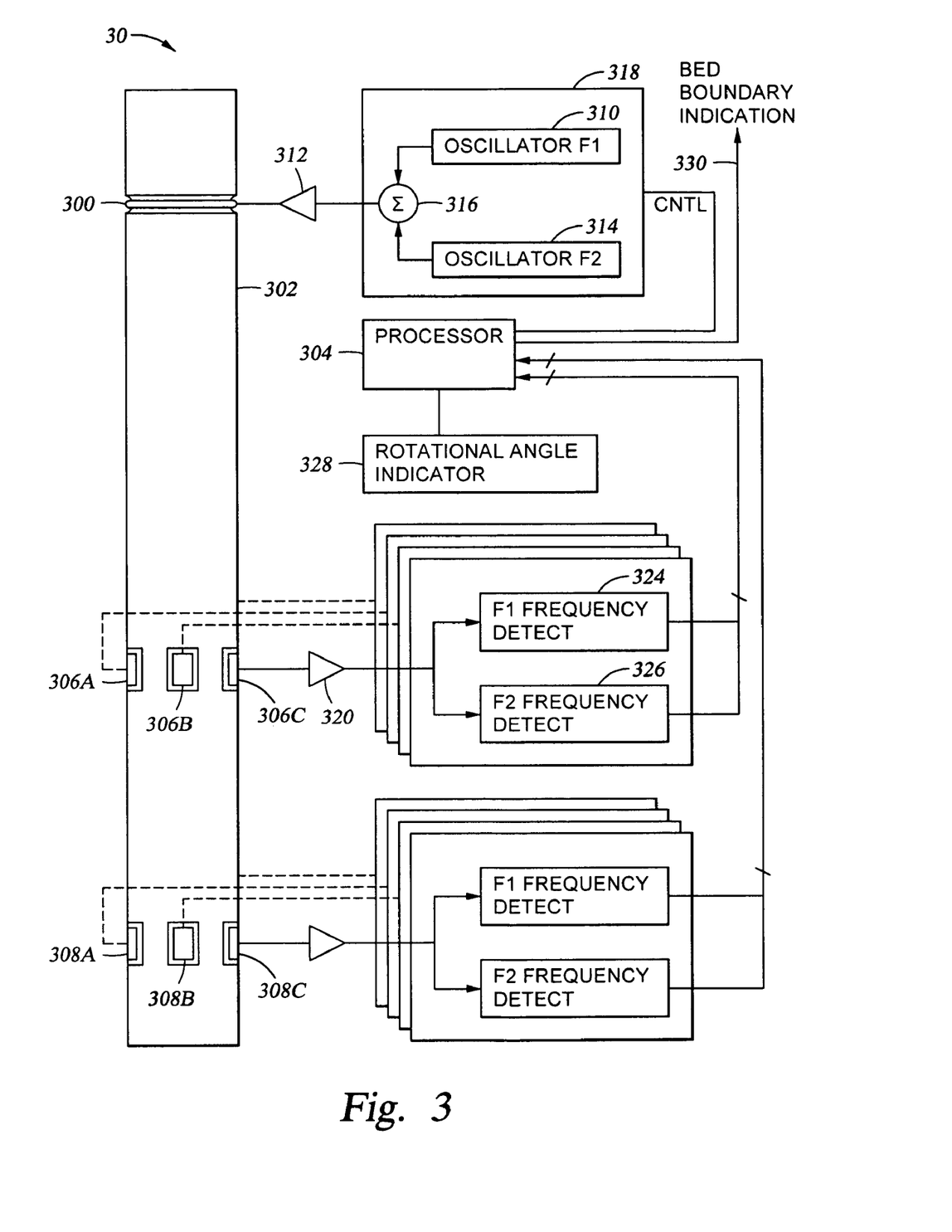
FIG. 3 illustrates a downhole tool.

FIG. 3 shows tool 30 in accordance with some embodiments of the invention. Electrical components of the tool 30, while disposed within the tool 30 or within portions of the bottom hole assembly 26 proximate to the tool 30, are shown beside the tool for clarity of the figure. In particular, tool 30 in accordance with these embodiments comprises a transmitting antenna 300 disposed on an outer surface of the tool 30, where the transmitting antenna circumscribes the tool body 302. A transmitting antenna circumscribing the tool body 302 in the manner illustrated in FIG. 3 produces an omnidirectional electromagnetic wave. Omnidirectional in this specification, and in the claims, means that the electromagnetic wave produced propagates away from the tool body 302 in substantially all radial directions equally, and encompasses situations where an axis of the antenna 300 and the axis of the tool body 302 are not parallel. Stated otherwise, the radiation pattern for antenna 300 extends outward in substantially all radial directions.

Tool 30 further comprises one or more receiving antennas 306 configured to be directionally sensitive, with the receiving antennas 306 at a first axial elevation that is spaced apart from the axial elevation of the transmitting antenna 300. Specific embodiments of receiving antennas are discussed below. FIG. 3 shows three receiving antennas 306 (with a fourth assumed but not visible). As few as one receiving antenna 306 may be used, and in some embodiments eight receiving antennas are used, with the maximum number of receiving antennas 306 constrained only by space considerations on the tool body 302. Tool 30 further comprises a second set of receiving antennas 308 also configured to be directionally sensitive, with the receiving antennas 308 at a second axial elevation that is spaced apart from the axial elevation of the transmitting antenna 300. FIG. 3 shows three receiving antennas 308 (with a fourth assumed but not visible). Here too as few as one receiving antenna 308 may be used, and in some embodiments eight receiving antennas are used, the maximum number of receiving antennas 308 constrained only by space considerations on the tool body 302.

In accordance with the embodiments illustrated in FIG. 3, the transmitting antenna emits an omnidirectinal electromagnetic wave that propagates into the formation surrounding the borehole, which electromagnetic wave may be referred to as an interrogating electromagnetic wave. The interrogating electromagnetic wave either propagates to each receiver, and/or induces another electromagnetic wave that propagates to each receiver, with the electromagnetic waves at the receivers referred to as responsive electromagnetic waves. The difference in amplitude between responsive electromagnetic waves received at the same radial position but receivers at different axial elevations, and/or the phase difference between the responsive electromagnetic waves at the receivers is indicative of the resistivity (inverse of conductivity) at a particular radial depth of investigation. The radial depth of investigation is a function of the axial spacing between the transmitting antenna and the receivers, as well as the frequency of the interrogating electromagnetic waves.

Still referring to FIG. 3, in order to generate the interrogating electromagnetic wave, the electronics of the tool 30 may comprise an oscillator 310 that couples to the transmitting antenna 300 by way of an amplifier 312. In embodiments where the interrogating electromagnetic wave has multiple frequencies, one or more additional oscillators may be present (illustrated by oscillator 314), which couple to the transmitting antenna 300 by way of a mixer 316 and the amplifier 312. The timing of generating the signals which become the interrogating electromagnetic wave, whether those signals contain substantially a single frequency or multiple frequencies, is controlled by a processor 304. The processor 304 may be located within the tool body 302, or within some other portion of the bottom hole assembly 26, such as the downhole controller 40 (FIG. 1). The oscillators 310, 314 and mixer 316 may be constructed from individual circuit components (e.g., crystal oscillators, resistors, capacitors, diodes), or the function of the components within box 318 may be implemented by digital signal processing, such as software executed by the processor 304 or a dedicated digital signal processing system.

Responsive electromagnetic waves received by receiver 306C generate a responsive signal that couples to amplifier 306C, and further couples to detection systems 324 and 326. While two detection circuits are shown, any number may be used. Each of the receivers may have its own amplifier and detection circuit, but duplicative components are omitted so as not to unduly complicate the figure. In some embodiments the detection circuits 324 and 326 may be constructed from individual circuit components, and in alternative embodiments responsive signals produced by the receiving antennas may be digitized and analyzed by means of digital signal processing. Similarly for the electronics associated with illustrative receivers 308, multiple detection circuits may exist one each for each receiver, or the detection may be done by way of digital signal processing techniques.

Still referring to FIG. 3, the processor 304 gathers data from the receivers, and may correlate the data from the receivers with a signal from a rotational angle indicator 328, if present. In some embodiments rotational angle indicator 328 is located within the tool body 302, and in alternative embodiments the rotational angle indicator 328 is located in another portion of the bottom hole assembly 26, such as the instrument sub 34 or downhole controller 40. Using the various pieces of data, the processor 304 produces an output signal 330 indicative of the proximity of the bed boundary. In some embodiments, the output signal 330 indicative of the proximity of the bed boundary may be the raw data from the receivers bundled by the processor and sent to the surface using any available form of telemetry. At the surface, further analysis may be undertaken, and if needed corrective action to the drilling direction taken. In alternative embodiments, the processor 304 may perform the actions of calculating resistivities, comparing the various resistivities, and producing the output signal 330 indicative of the proximity of the bed boundary (e.g., distance to the bed boundary, estimated distance to bed boundary at current trajectory, and dip angle of the borehole relative to the bed boundary). In embodiments where the output signal 330 more directly indicates the proximity of the bed boundary, the output signal 330 may be sent to the surface and corrective action taken, or the output signal 330 may couple to a downhole device, such as the downhole controller 40, which automatically changes the drilling direction to keep the borehole within the pay zone.

Figure 4A:
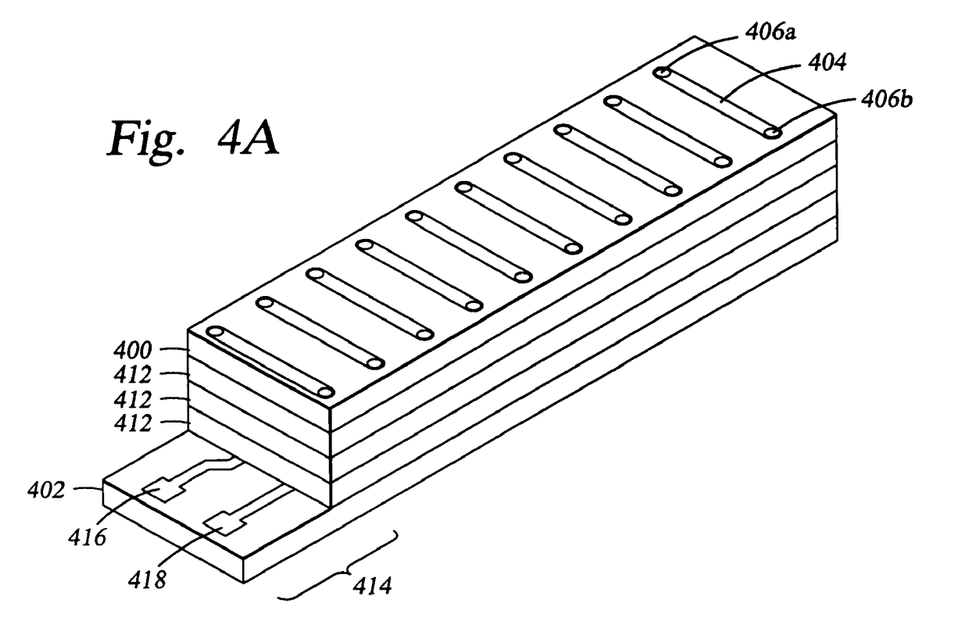
FIG. 4A illustrates a perspective view of a PCB based antenna.

Turning now the implementing the directional sensitivity of the receiving antennas 306 and 308, FIG. 4A shows a perspective view of a printed circuit board (PCB) based ferrite core antenna which may be used as a receiving antenna in accordance with embodiments of the invention. In particular, the PCB based ferrite core antenna comprises an upper board 400 and a lower board 402. The upper board 400 comprises a plurality of electrical traces 404 that span the board 400 substantially parallel to its width or short dimension. In the embodiments shown in FIG. 4A, ten such traces 404 are shown; however, any number of traces may be used depending upon the number of turns desired for the antenna. At the end of each trace 404 is a contact hole, for example holes 406A and 406B, which extend through the upper board 404. As will be discussed more thoroughly below, electrical contact between the upper board 400 and the lower board 402 preferably takes place through the contact holes at the end of the traces.

Figure 4B:
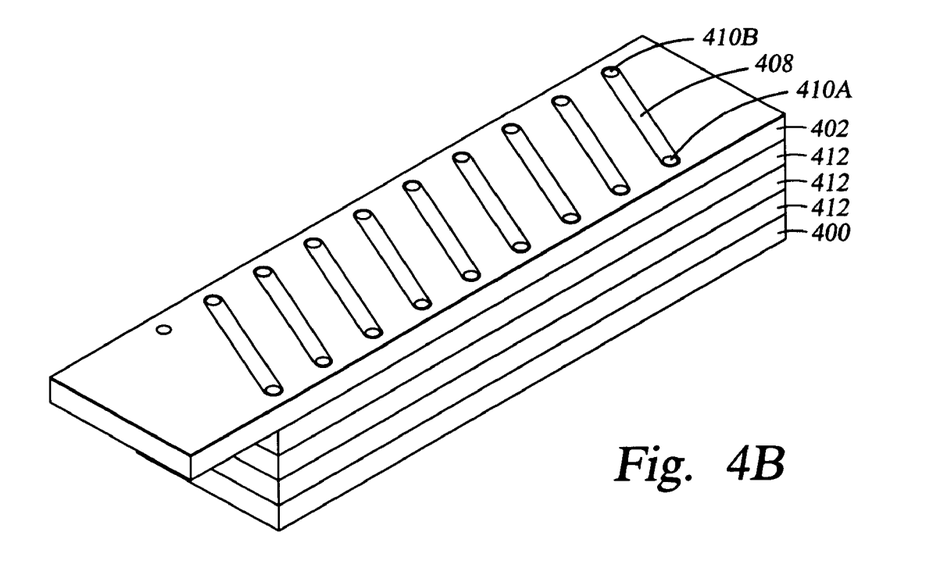
FIG. 4B illustrates a perspective view of a PCB based antenna.

FIG. 4B shows a perspective view of the antenna of FIG. 4A with board 402 in an upper orientation. Similar to board 400, board 402 comprises a plurality of traces 408, with each trace having at its ends a contact hole, for example holes 410A and 410B. Unlike board 400, however, the traces 408 on board 402 are at a slight angle. Thus, in these embodiments, the board 402 performs a cross-over function such that electrical current traveling in one of the traces 404 on board 400 crosses over on the electrical trace 408 of board 402, thus forcing the current to flow in the next loop of the overall circuit.

Referring somewhat simultaneously to FIGS. 4A and 4B, between board 400 and board 402 reside a plurality of intermediate boards 412. The primary function of an intermediate board 412 is to contain the ferrite material between board 400 and board 402, as well as to provide conduction paths for the various turns of electrical traces around the ferrite material. In the perspective views of FIGS. 4A and 4B, the board 402 is elongated with respect to board 400, and thus has an elongated section 414. In these embodiments, the elongated section 414 of board 402 has a plurality of electrical contacts, namely contact points 416 and 418. The contact points 416 and 418 are the location where electrical contact is made to the PCB based ferrite core antenna. Thus, these are the locations where electrical coupling is made with the detection circuits (FIG. 3).

Figure 5:
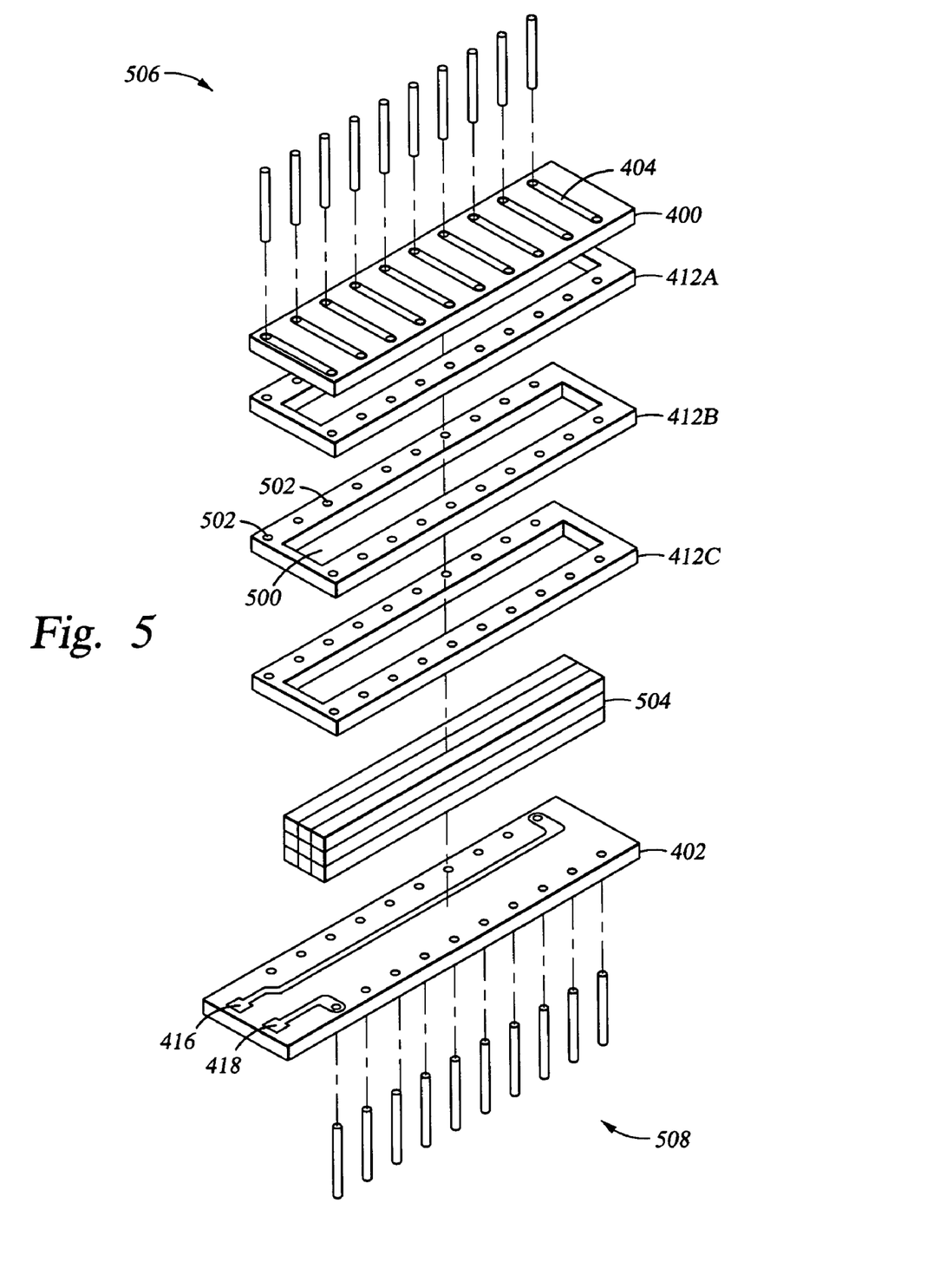
FIG. 5 illustrates an exploded perspective view of the PCB based antenna.

FIG. 5 shows an exploded perspective view of the PCB based ferrite core antenna. In particular, FIG. 5 shows board 400 and board 402, with the various components coupled between the two boards in exploded view. FIG. 5 shows three intermediate boards 412A, B and C, and although any number may be used based on the thickness of the boards, the amount of ferrite material to be contained therein, and whether it is desirable to completely seal the ferrite within the boards. Each of the intermediate boards 412 comprises a central hole 500, and a plurality of interconnect holes 502. As the intermediate boards 412 are stacked, their central holes form an inner cavity where a plurality of ferrite elements 504 are placed. The intermediate boards 412 and the ferrite material 504 are sandwiched between the board 400 and the board 402. In some embodiments, electrical contact between the traces 404 of board 400 and the traces 408 of board 402 (not shown in FIG. 5) is made by a plurality of contact wires or pins 506 and 508. The contact pins 506, 508 extend through the contact holes 406 in the upper board, the holes 502 in the intermediate boards, and the holes 410 in board 402. The length of the contact pins is dictated by the overall thickness of the PCB based antenna, and electrical contact between the contact pins and the traces is made by soldering each pin to the trace 404 and 408 that surround the contact hole through which the pin extends. In other embodiments, rather than using the contact pins 506 and 508, the PCB based ferrite core antenna is manufactured in such a way that solder or other electrically conductive material extends between the board 400 and the board 402 through the connection holes to make the electrical contact. Thus, the electrically conductive material, whether solder, contact pins, or other material, electrically couples to the traces on the boards 400 and 402, thereby creating a plurality of turns of electrically conductive path around the ferrite core.

The materials used to construct board 400, board 402, or any of the intermediate boards 412 may take several forms depending on the environment in which the PCB based antenna is used. In harsh environments where temperature ranges are expected to exceed 200° C., the boards 400, 402 and 412 are made of a glass reinforced ceramic material, and such material may be obtained from Rogers Corporation of Rogers, Conn. (for example material having part number R04003). In applications where the expected temperature range is less than 200° C., the boards 400, 402 and 412 may be made from glass reinforced polyamide material (conforming to IPC-4101, type GIL) available from sources such as Arlon, Inc. of Bear, Del., or Applied Signal, Inc. Further, in some embodiments, the ferrite material in the central or inner cavity created by the intermediate boards 412 is a high permeability material, preferably Material 77 available from Elna Magnetics of Woodstock, N.Y. As implied in FIG. 5, the ferrite core 504 is a plurality of stacked bar-type material; however, the ferrite core may equivalently be a single piece of ferrite material, and may also comprise a dense grouping of ferrite shavings, or the like.

Further, FIG. 5 shows how the contacts 416 and 418 electrically couple to the traces 404 and 410. In particular, in the embodiments shown in FIG. 5 the electrical contact 416 extends along the long dimension of board 402, and surrounds a contact hole at the far end. Whether the connection pins 506, 508 are used, or whether other techniques for connecting traces on multiple levels of circuit board are used, preferably the trace 416 electrically couples to the winding created by the traces 404, traces 408 and interconnections between the traces. Likewise, the connection pad 418 electrically couples to a trace that surrounds a closest contact hole on the opposite side of the connection made for pad 416. Through techniques already discussed, the contact point 418 is electrically coupled to the windings of the antenna. Although not specifically shown in FIG. 5, the ferrite core 504 is electrically isolated from the traces. This isolation may take the form of an insulating sheet, or alternatively the traces could be within the non-conductive board 402 itself.

Before proceeding, it must be understood that the embodiments shown in FIGS. 4 and 5 are merely exemplary of the idea of using traces on a printed circuit board, as well as electrical connections between various layers of board, to form the windings or turns of electrical conduction path around a ferrite core held in place by the PCBs. In some embodiments, the ferrite core is sealed within the inner cavity created by the intermediate boards by having those intermediate boards seal to each other. However, depending on the type of ferrite material used, or the proposed use of the antenna (or both), it would not be necessary that the intermediate boards seal to one another. Instead, the connecting pins 506 and 508 could suspend one or more intermediate boards between the boards 400, 402 having the electrical traces, thus keeping the ferrite material within the cavity defined by the intermediate boards, and also keeping the ferrite material from coming into electrical contact with the connecting pins. Further, the embodiments of FIGS. 4 and 5 have extended portion 414 of board 402 to provide a location for the electrical coupling of signal wires. However, this extended portion 414 need not be present, and instead the wires for electrically coupling the PCB based ferrite core antenna could solder directly to appropriate locations on the antenna. Further still, depending upon the particular application, the PCB based ferrite core antenna may also itself be encapsulated in a protective material, such as epoxy, in order that the board material not be exposed to the environment of operation. Further still, techniques exist as of the writing of this specification for embedding electrical traces within a printed circuit board such that they are not exposed, other than their electrical contacts, on the surfaces of the printed circuit board, and this technology too could be utilized in creating the board 400 and board 402. Moreover, embodiments of the PCB based ferrite core antenna such as that shown in FIGS. 4 and 5 may have a long dimension of approximately 8 centimeters, a width approximately 1.5 centimeters and a height of approximately 1.5 centimeters. A PCB based ferrite core antenna such as that shown in FIGS. 4 and 5 with these dimensions may be suitable for directional or azimuthally sensitive formation resistivity measurements. In situations where borehole imaging is desired, the overall size may become smaller, but such a construction does not depart from the scope and spirit of this invention.

Figure 6:
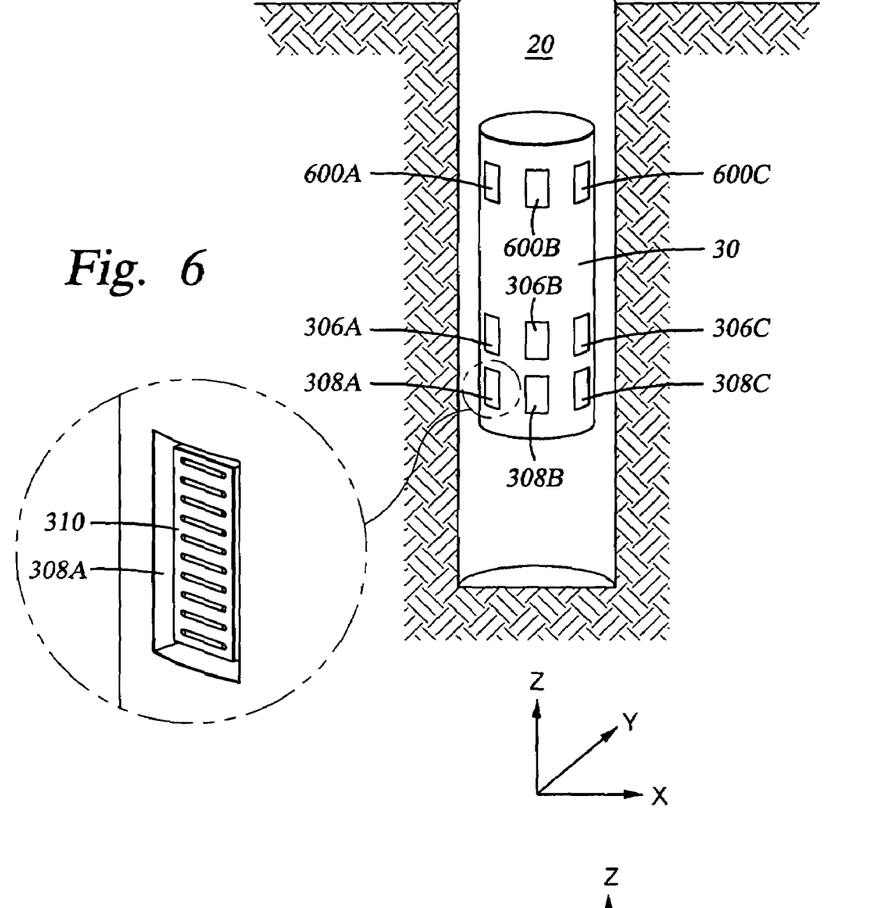
FIG. 6 illustrates alternative embodiments of a tool.

FIG. 6 shows alternative embodiments of the invention. In particular, FIG. 6 shows embodiments where, rather than using a loop antenna as the source antenna, a plurality of PCB based ferrite core antennas are themselves used to generate the interrogating electromagnetic waves. In particular, FIG. 6 shows a tool 30 disposed within a borehole 20. In these embodiments, the interrogating electromagnetic waves are generated by a plurality of PCB based ferrite core antennas 600, whose construction is discussed above. Although the exemplary drawing of FIG. 6 shows only three such antennas 600A, 600B and 600C, any number of antennas may be spaced around the circumference of the tool, and it is preferred that eight such antennas are used. Similar to the embodiments shown in FIG. 2, the embodiments of FIG. 6 comprise a first and second plurality receiving antennas 306 and 308, which in some embodiments are each a PCB based ferrite core antennas as discussed above. In the perspective view of FIG. 6, only three such receiving antennas 306A, 306B and 306C are visible for the first plurality, and only three receiving antennas 308A, 308B and 308C are visible for the second plurality; however, any number of antennas may be used, and in some embodiments eight such antennas are used at each of the first and second plurality. Operation of the tool 30 of FIG. 6 may comprise transmitting electromagnetic waves with all of the transmitting antennas 600 simultaneously, or may alternatively comprise firing each of the transmitting antennas 600 sequentially.

In a fashion similar to that described with respect to FIG. 2, receiving the responsive electromagnetic waves is accomplished with each individual receiving antenna 306 and 308. By virtue of the radial or circumferential spacing about the tool 30 and that the receiving antennas 306 and 308 are each placed within cavity, inset or pocket 310, the responsive electromagnetic waves are received from azimuthally sensitive directions.

Figure 7A:
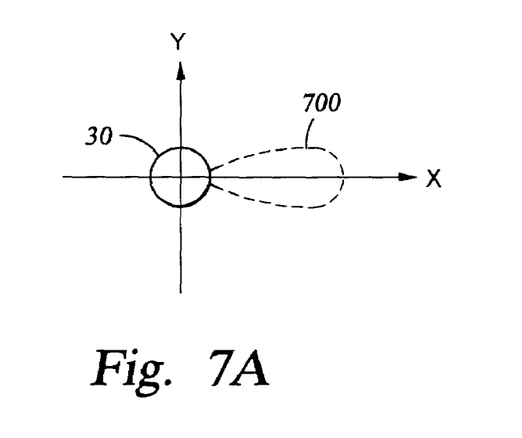
FIG. 7A illustrates a radiation/sensitivity pattern for an antenna.
Figure 7B:
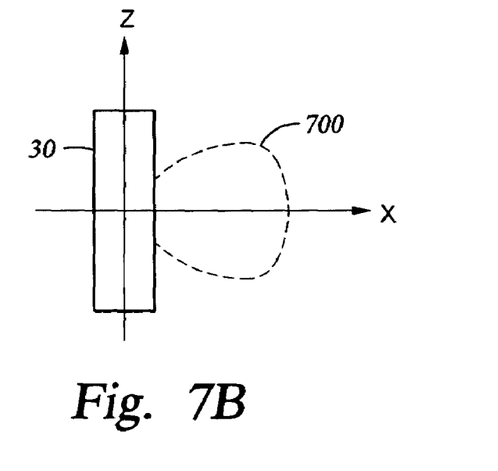
FIG. 7B illustrates a radiation/sensitivity pattern for an antenna.

For purposes of explanation of radial or azimuthal sensitivity, FIG. 6 defines a coordinate system with the Z axis corresponding to the axis of the tool 30, and the X and Y axis forming a plane, with the Z axis normal to the plane. This coordinate system follows the tool 30, such that if the tool 30 is in the substantially horizontal orientation of FIG. 2, the Z axis still aligns with the tool 30 axis. FIG. 7A shows a view of tool 30 looking along the Z axis. The shaded area is illustrative of the sensitivity pattern for a receiving antenna (e.g., a PCB based antenna) within a pocket of the tool. Because of the orientation, the sensitivity pattern has a single lobe 700. Likewise, FIG. 7B shows a view of tool 30 looking along the Y axis. The shaded area in FIG. 7B is illustrative of the sensitivity pattern for an antenna within a pocket of the tool. Again, because of the orientation within the pocket, the sensitivity pattern has single lobe 700. In embodiments such as those of FIG. 6 where the transmitting antennas are similar to the receiving antennas, the sensitivity patterns of FIGS. 7A and 7B are also illustrative of the radiation pattern of the transmitting antennas, and thus these transmitting antennas have substantially a single lobe radiation pattern. There may be minor side lobes to the sensitivity/radiation pattern because of reflection within the pocket and interference caused by the reflections, but these side lobes will be 10 db less than the main lobe. Thus, for purposes of this specification and claims, any sensitivity/radiation pattern having a main lobe and side lobes 10 db or less than the main lobe are considered to be single lobe systems.

Figure 8:
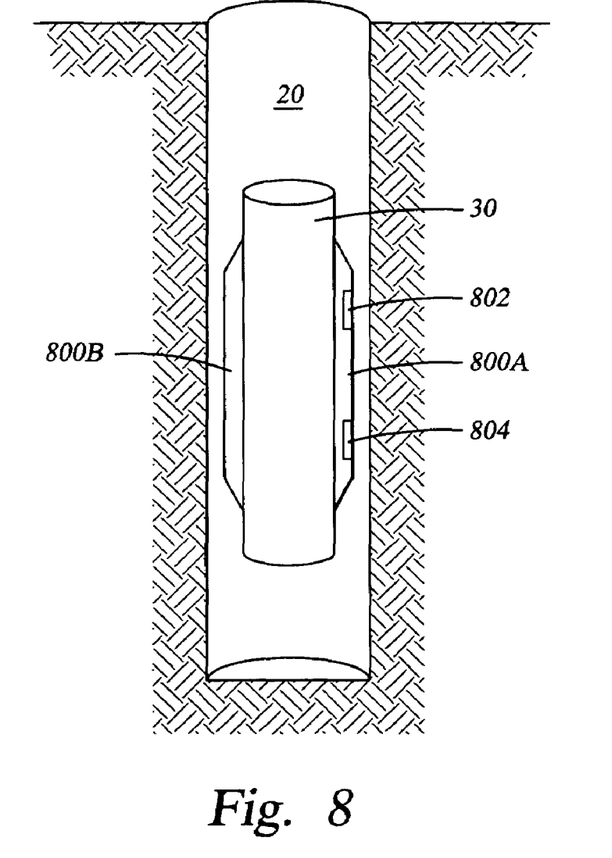
FIG. 8 illustrates alternative embodiments of a tool.

FIG. 8 shows yet other embodiments of an electromagnetic wave resistivity tool using the PCB based ferrite core antennas as described above. In particular, FIG. 8 shows tool 30 disposed within borehole 20. In the embodiments shown in FIG. 8, the tool 30 comprises one or more stabilizing fins 800A and 800B. In these embodiments, the PCB based ferrite core antennas are preferably placed within insets or pockets of the stabilizing fin 800 near its outer surface. In particular, the tool may comprise a source antenna 802 and a receiving antenna 804 disposed within the stabilizer fin 800A. Operation of a tool such as tool 30 is similar to the previous embodiments in that the source antenna 802 generates an interrogating electromagnetic wave, and a responsive electromagnetic wave is received by the receiving antenna 804. By virtue of the receiving antenna's location on a particular side of a tool 30, the responsive electromagnetic wave is received is in azimuthally sensitive directions.

Figure 9:
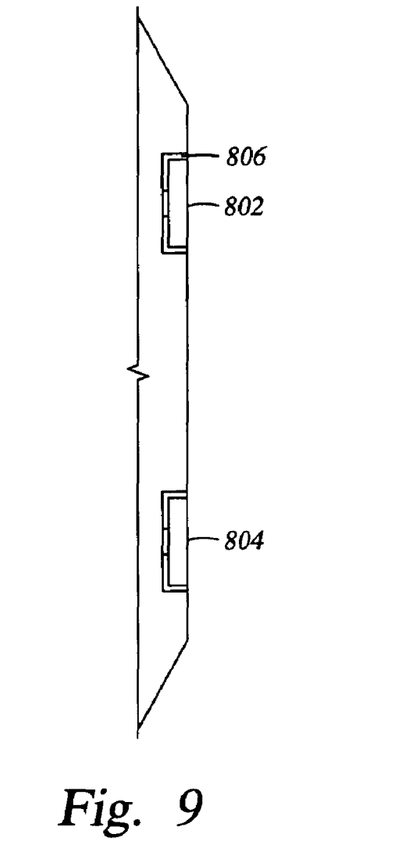
FIG. 9 further illustrates the alternative embodiments of FIG. 8.

FIG. 9 further illustrates that the antennas, in this example antennas 802 and 804, may be mounted within a recesses, inset or pocket 806 on a blade of the tool. With respect to FIGS. 2 and 6, the pockets 310 are in the tool body 302 itself. With respect to FIG. 8, the pockets are on the stabilizing fin 800A. Although the printed circuit board based ferrite core antennas, if operated in free space, would be omnidirectional, because of their small size relative to the tool body, and the fact they are mounted within pockets, they become directionally sensitive as discussed above. Additional directional sensitivity may be accomplished by way of a cap arrangement.

Figure 10:
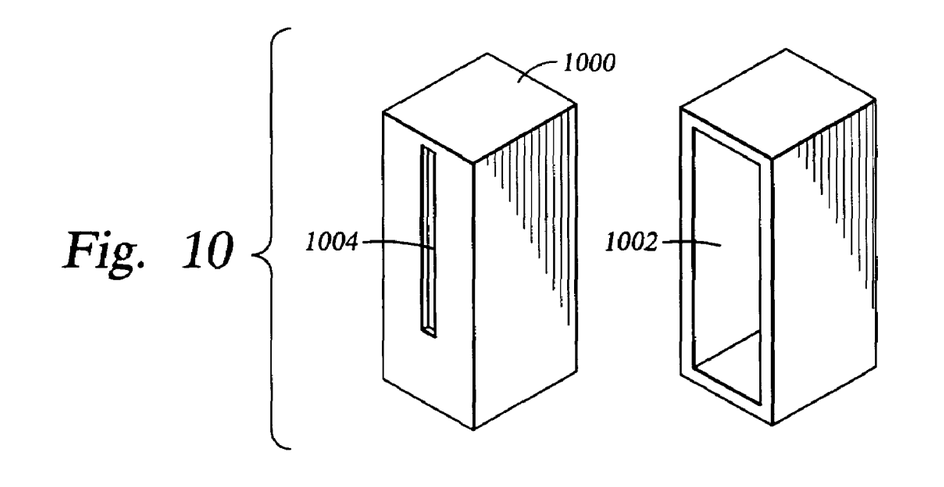
FIG. 10 illustrates a cap assembly.

FIG. 10 shows an exemplary cap arrangement for covering the PCB based ferrite core antennas to achieve greater directionality. In particular, cap 1000 comprises a hollowed inner surface 1002, having sufficient volume to cover a PCB based ferrite core antenna. In a front surface of the cap 1000 there is a slot 1004. Operation of the cap 1000 in any of the embodiments involves placing the cap 1000 over the (receiving or transmitting) antenna within the cavity 1002 covering the PCB based ferrite core antenna, and the slot 1004 exposed to an outer surface of the tool. As for receiving, responsive electromagnetic wave radiation, specifically the magnetic field components, access and therefore induce a current flow in the PCB based ferrite core antenna within the cap through the slot 1004. The smaller the slot along its short distance, the greater the directional sensitivity becomes.

Figure 11:
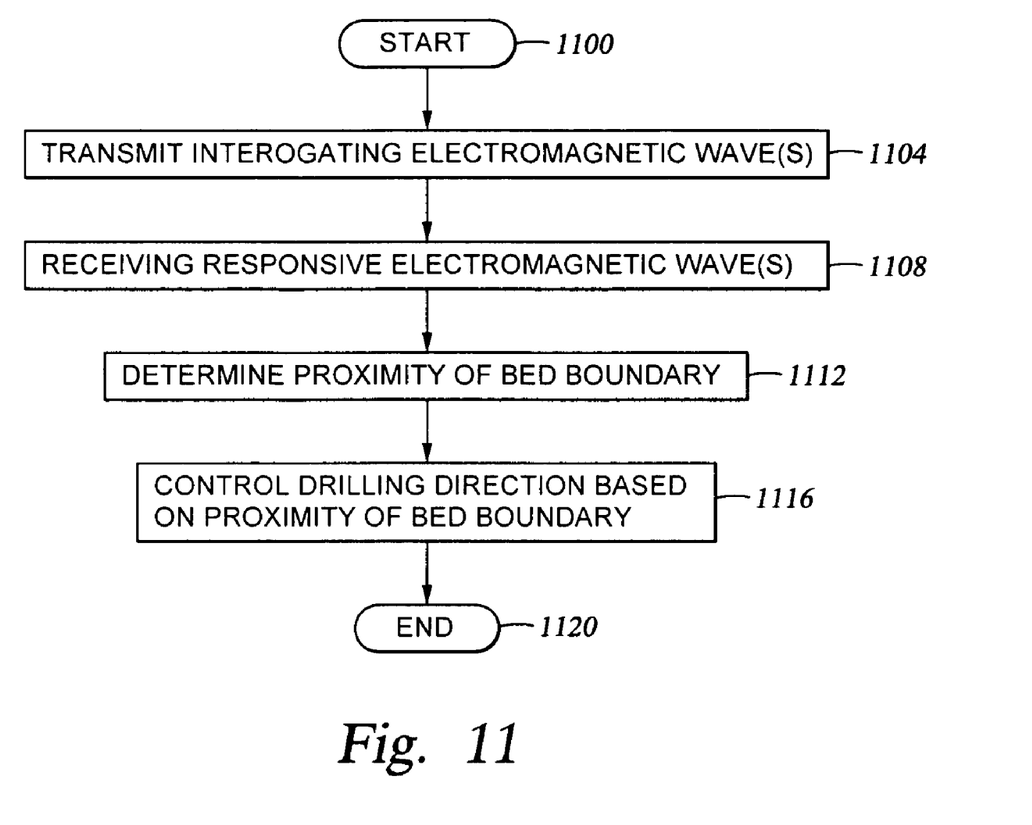
FIG. 11 illustrates a method.

FIG. 11 illustrate a method in accordance with embodiments of the invention. In particular, the method starts (block 1100) and proceeds to transmitting an interrogating electromagnetic wave from the tool within a drill string (block 1100). The transmitting is at a first axial elevation, and the interrogating electromagnetic wave propagates into the formation surround the borehole. Next, a response electromagnetic wave is received (block 1108), in some embodiments by a first receiving antenna configured to have a single lobe radiation pattern. From the received signals, a determination is made as to the proximity of the tool to the bed boundary (block 1112). Finally, drilling direction is controlled based on the proximity of the tool to the bed boundary (block 1116), and the process ends (block 1120).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   transmitting an interrogating electromagnetic wave from a tool in a borehole into a formation surrounding the borehole;
   receiving a first responsive electromagnetic wave from the formation by a first receiving antenna having a sensitivity pattern with a single primary lobe;
   determining at least one of direction and/or proximity of a bed boundary using the first responsive electromagnetic wave; and
   controlling drilling direction based on the signal received by the first receiving antenna.

2. The method as defined in claim 1 wherein transmitting further comprises transmitting an omnidirectional interrogating electromagnetic wave.

3. The method as defined in claim 2 wherein transmitting further comprises transmitting from an antenna that circumscribes the tool.

4. The method as defined in claim 1 wherein transmitting further comprises transmitting the interrogating electromagnetic wave that has a radiation pattern with a single primary lobe.

5. The method as defined in claim 4 wherein transmitting further comprises transmitting with a transmitting antenna within an inset of the tool.

6. The method as defined in claim 5 wherein transmitting further comprises transmitting by the transmitting antenna within the inset on a stabilizer of the tool.

7. The method as defined in claim 1 wherein receiving further comprises receiving at the first receiving antenna within an inset of the tool.

8. The method as defined in claim 7 wherein receiving further comprises receiving at the first receiving antenna within the inset on a stabilizer of the tool.

9. The method as defined in claim 1 further comprising:
   receiving a second responsive electromagnetic wave from the formation by a second receiving antenna configured to have a sensitivity pattern with a single primary lobe; and
   wherein determining further comprises determining proximity to the bed boundary using one or both of the first and second responsive electromagnetic waves.

10. The method as defined in claim 9 wherein the transmitting is performed at a first axial position, and wherein receiving the second responsive electromagnetic wave further comprises receiving the second responsive electromagnetic wave at approximately the same axial elevation as the receiving of the first responsive electromagnetic wave, but at a different radial position on the tool.

11. The method as defined in claim 1 wherein transmitting the interrogating electromagnetic wave further comprises simultaneously transmitting an interrogating electromagnetic wave having a first frequency, and an interrogating electromagnetic wave having a second frequency.

12. A tool for steering a downhole drilling apparatus comprising:
   a transmitting antenna disposed on an outer surface of the tool that transmits an interrogating electromagnetic wave into a formation surrounding the tool;
   a first receiving antenna configured to have a sensitivity pattern with a single primary lobe, the first receiving antenna disposed on the outer surface of the tool, the first receiving antenna receives a first responsive electromagnetic wave from the formation and produces a first responsive signal; and
   a processor coupled to the receiving antenna, and wherein the processor generates, at least in part based on the first responsive signal, an output signal that indicates proximity of the tool to a bed boundary.

13. The tool as defined in claim 12 further comprising:
   a rotational angle indicator coupled to the processor, the rotational angle indicator produces an angle signal that indicates the rotational angle of the tool;
   wherein the processor correlates the angle signal and the first responsive signal to generate the output signal.

14. The tool as defined in claim 13 wherein the rotational angle indicator comprises one or more selected from the group: a fluxgate; a magnetometer; and accelerometer; and a gyroscope.

15. The tool as defined in claim 12 wherein the transmitting antenna circumscribes the tool and produces an omni-directional radiation pattern.

16. The tool as defined in claim 12 wherein the transmitting antenna is disposed within a cavity in an outer surface of the tool, and wherein the transmitting antenna radiation pattern has a single primary lobe.

17. The tool as defined in claim 16 wherein the transmitting antenna is disposed on a stabilizer blade of the tool.

18. The tool as defined in claim 12 wherein the transmitting antenna simultaneously transmits an interrogating electromagnetic wave having a first frequency, and an interrogating electromagnetic wave having a second frequency.

19. The tool as defined in claim 12 wherein the receiving antenna is disposed within a cavity in an outer surface of the tool.

20. The tool as defined in claim 12 further comprising:
a second receiving antenna that has a sensitivity pattern with a single primary lobe, the second receiving antenna disposed on the outer surface of the tool at approximately the same axial elevation as the first receiving antenna, but at a different radial orientation, wherein the second receiving antenna receives a second responsive electromagnetic wave from the formation and produces a second responsive signal;
wherein the processor generates, at least in part on the first and second responsive signals, an output signal that indicates proximity of the tool to a bed boundary.

21. A tool for steering a downhole drilling apparatus comprising:
a means for transmitting an interrogating electromagnetic wave into a formation surrounding a borehole, the means for transmitting disposed on an outer portion of the tool;
a means for receiving a responsive electromagnetic wave from the formation and producing a responsive signal, the means for receiving disposed on the outer portion of the tool and the means for receiving having a sensitivity pattern with a single primary lobe;
a means for processing the responsive signal and generating an output signal that indicates the proximity of the tool to a geological bed boundary.

22. The tool as defined in claim 21 further comprising:
a means for indicating a rotational angle of the tool and producing an angle signal, the means for indicating coupled to the means for processing;
wherein the means for processing correlates the angle signal and the first responsive signal to generate the output signal.

23. The tool as defined in claim 21 wherein the means for transmitting is disposed on a stabilizer blade of the tool.

24. The tool as defined in claim 21 further comprising:
a second means for receiving that has a single lobe radiation pattern, the second mans for receiving disposed on the outer surface of the tool at approximately the same axial elevation as the first means for receiving, but at a different radial orientation, wherein the second means for receiving receives a second responsive electromagnetic wave from the formation and produces a second responsive signal;
wherein the means for processing generates, at least in part on the first and second responsive signals, an output signal that indicates proximity of the tool to the geological bed boundary.

* * * * *

UNITED STATES PATENT AND TRADEMARK OFFICE
CERTIFICATE OF CORRECTION

PATENT NO. : 7,345,487 B2 Page 1 of 1
APPLICATION NO. : 11/385404
DATED : March 18, 2008
INVENTOR(S) : Michael S. Bittar et al.

It is certified that error appears in the above-identified patent and that said Letters Patent is hereby corrected as shown below:

In Column 10, line 43 of the patent:

"configured to have", should read --that has--.

Signed and Sealed this

Twenty-third Day of March, 2010

David J. Kappos
*Director of the United States Patent and Trademark Office*